(12) United States Patent
Rogozienski

(10) Patent No.: US 7,281,727 B2
(45) Date of Patent: Oct. 16, 2007

(54) MOTORCYCLE FOOT PEG "CRADLE MOUNT BRACKET"

(76) Inventor: John Rogozienski, 632 Marsat Ct., Suite B, Chula Vista, CA (US) 91911

( * ) Notice: Subject to any disclaimer, the term of this patent is extended or adjusted under 35 U.S.C. 154(b) by 149 days.

(21) Appl. No.: 10/914,371

(22) Filed: Aug. 10, 2004

(65) Prior Publication Data
US 2006/0033307 A1    Feb. 16, 2006

(51) Int. Cl.
*B62J 25/00* (2006.01)
(52) U.S. Cl. ..................... 280/293
(58) Field of Classification Search ........ 280/291–301; 180/219
See application file for complete search history.

(56) References Cited

U.S. PATENT DOCUMENTS 4,706,774 A * 11/1987 Tsuboi ................. 180/227
6,315,072 B1 * 11/2001 Brown et al. ............... 180/228
6,846,018 B2 * 1/2005 Dennert et al. ............. 280/785
6,957,821 B2 * 10/2005 Gorman et al. ............ 280/291

* cited by examiner

*Primary Examiner*—Lesley D. Morris
*Assistant Examiner*—L. Lum
(74) *Attorney, Agent, or Firm*—Charles C. Logan, II

(57) ABSTRACT

A motorcycle foot peg having a body portion adapted to bear the weight of a rider. The body portion will fold up about the mounting shaft, which is connected to the frame of the motorcycle by way of cradle mount brackets that sandwich the mounting shaft between engine and brackets. The mounting shaft support tabs with holes that correspond to the engine mounting threaded holes. The cradle mount brackets have corresponding holes to align with engine and mounting shaft tabs. The cradle mount brackets, mounting shaft and engine, will support the rider's weight on the foot peg load.

11 Claims, 4 Drawing Sheets

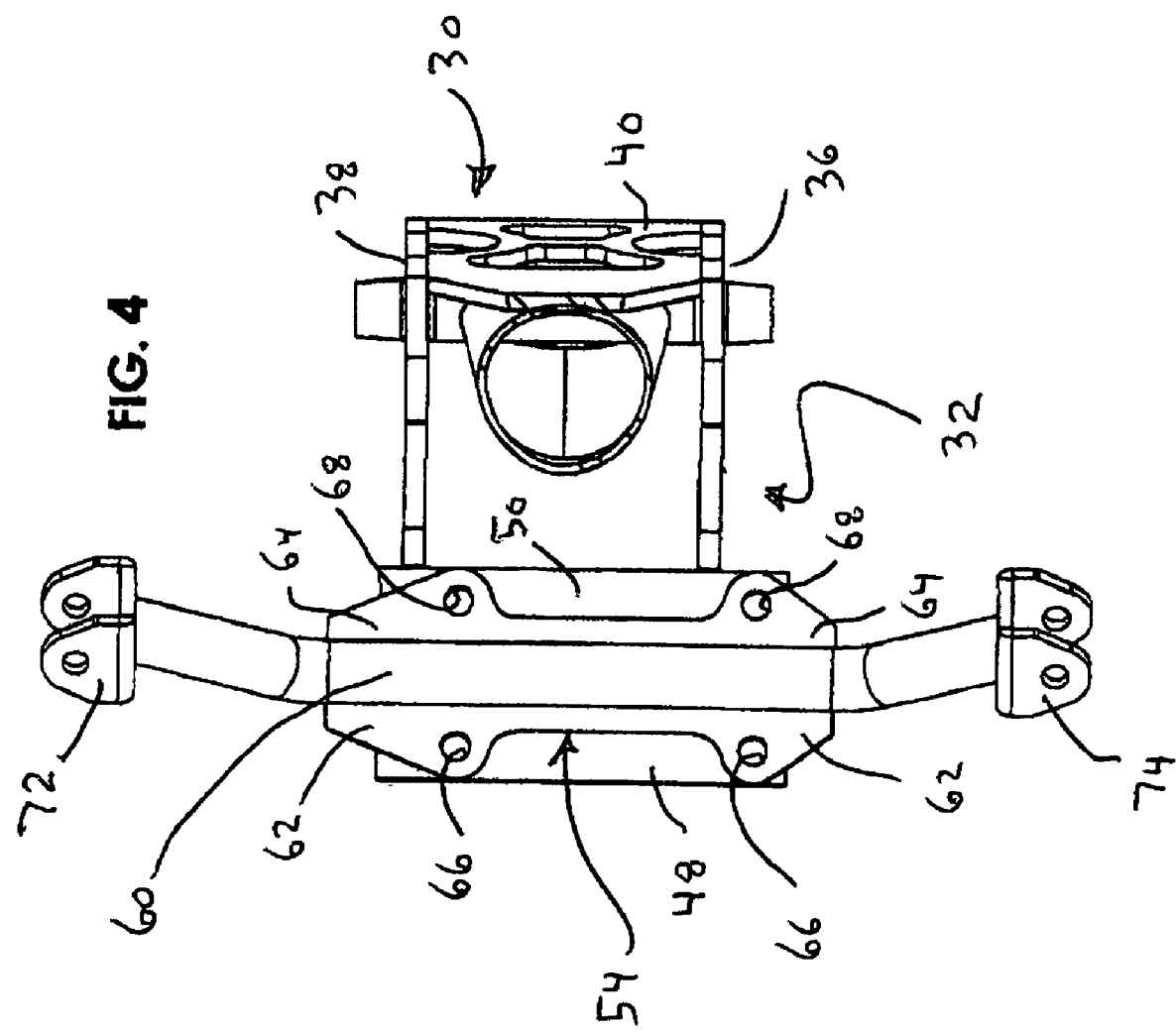

MOTORCYCLE FOOT PEG "CRADLE MOUNT BRACKET"

BACKGROUND OF THE INVENTION

1. Technical Field of the Invention

This invention relates to motorcycles and more particularly to an improvement in foot peg mounting for motorcycles. In this specification, reference to motorcycles includes both two and three wheeled motorcycles and also four wheeled all terrain vehicles, which are ridden in a manner similar to motor cycles.

2. Description of the Prior Art

As is well know, most motorcycle assemblies include a frame having a seat on which a rider sits in a straddle fashion. A pair of foot pegs are carried at the lower end of the frame at opposite sides thereof for the rider to place his feet when riding. Frequently, controls for operating certain components of the motorcycle, such as a rear wheel brake or gearshift, is located in close proximity to the foot pegs. This allows the operator to foot activate the said controls when desirable. It is common for motorcycle foot pegs to vary in appearance depending on intended application. Overall their basic design remains the same that is they provide an inert projection in an appropriate position for the support of the rider's feet. The design of the conventional motorcycle foot peg has some inherent disadvantages.

For example, motorcycle foot pegs that are built for simplified design often mount the foot pegs to the bottom of the engine with fasteners threaded into the engine cases. Frequently, however, the loads of the engine combined with rider weight will often flex the frame and movement will be felt as the unstableness is at the rider's feet.

Furthermore, current manufacturing designs incorporate cost savings and simplified production requirements to mount foot pegs directly to the engine and delete extra steps of typing into the frame.

It is a principal object of this invention to provide an improved foot peg mounting assembly for motorcycles. It is a further object of this invention to provide a foot peg assembly for motorcycles that increases strength, reliability and operator surefootedness and control.

SUMMARY OF THE INVENTION

The invention, in its broadest aspect includes a foot peg assembly for a motorcycle which has a foot peg assy that mounts to the bottom of the engine, a cradle mount adapted to be connected to the frame of a motorcycle, by way of brackets and a shaft extending outwardly from the mount and adapted to receive the foot peg there over the body can be supported by frame whereby sandwiched to the engine by way of fasteners into the engine.

The invention provides a foot peg assy mount for motorcycles that assists the motorcycle riders to lessen flex and add reliability in the foot peg assy. This will add to the operator's confidence and reduce fatigue and therefore retain a higher level of concentration.

BRIEF DESCRIPTION OF THE DRAWING FIGURES

In order that the invention can be more readily understood, described, by way of illustration, and in relation to the accompanying drawings, the embodiments of the invention.

In these drawings:

FIG. 4 is a section along line 4—4 of FIG. 2;

DESCRIPTION OF THE PREFERRED EMBODIMENT

Figure 1:
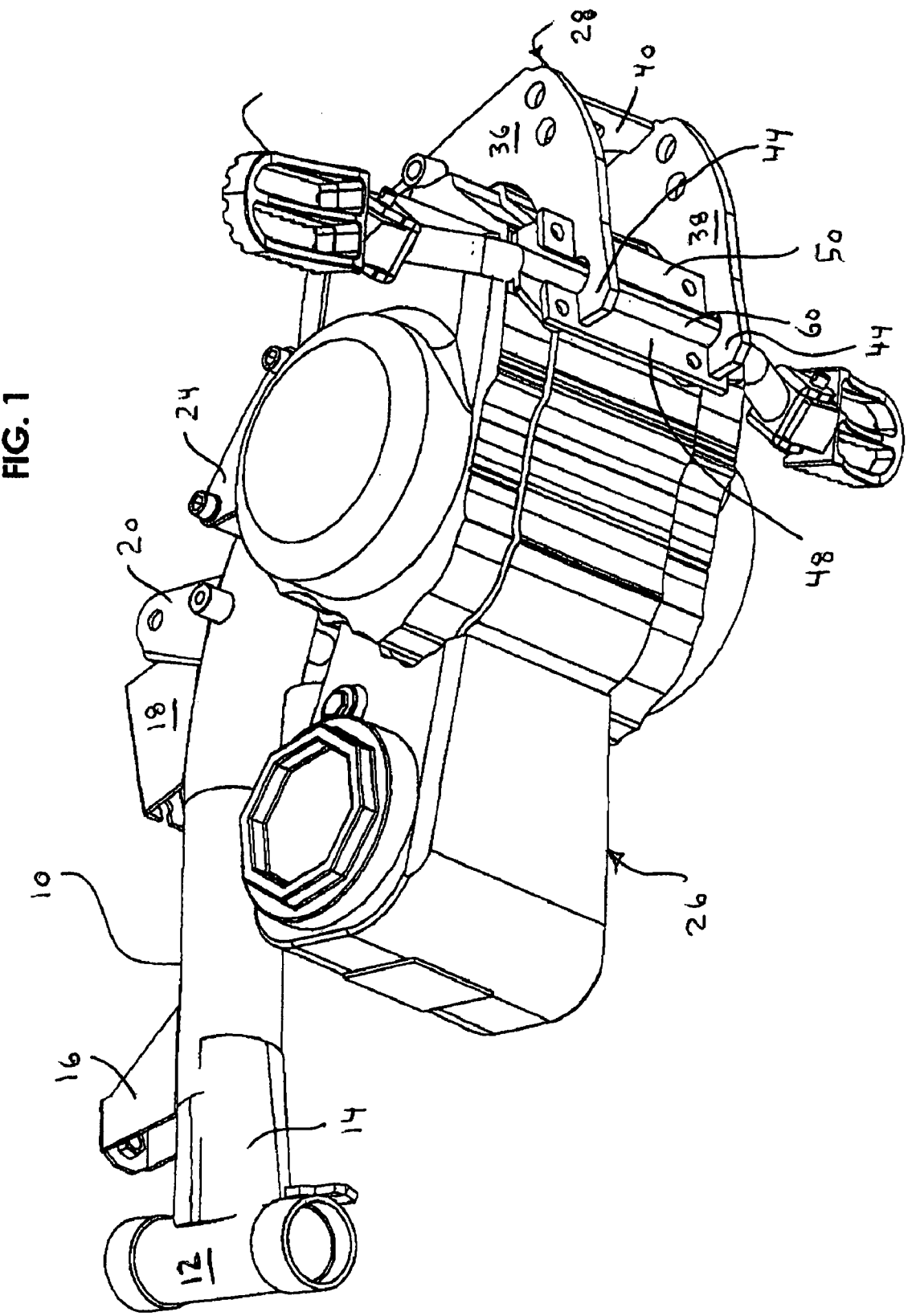
FIG. 1 shows a perspective view of a first embodiment of the foot peg assy cradle mount affixed to the frame of a motorcycle; with engine.

The invention will now be described by referring to FIGS. 1-4 of the drawing. FIG. 1 is bottom perpective view illustrating tubular main frame 10 of a motorcycle having a head fork tube 12 connected to its front end. A gusset 14 on each lateral side adds structural integrity to the connection between main frame 10 and head fork tube 12.

A fuel tank mount 16 is secured to the top surface of tubular main tube 10. A seat mounting bracket 18 is also secured to the top surface of tubular main frame tube 10. A shock mount 20 is connected to the top surface of main frame tube 10. Each side of main frame tube 10 has a pair of sub-frame mounts 22. Also each side of tubular main frame 10 has a motorcycle engine hangar bracket 24.

Figure 2:
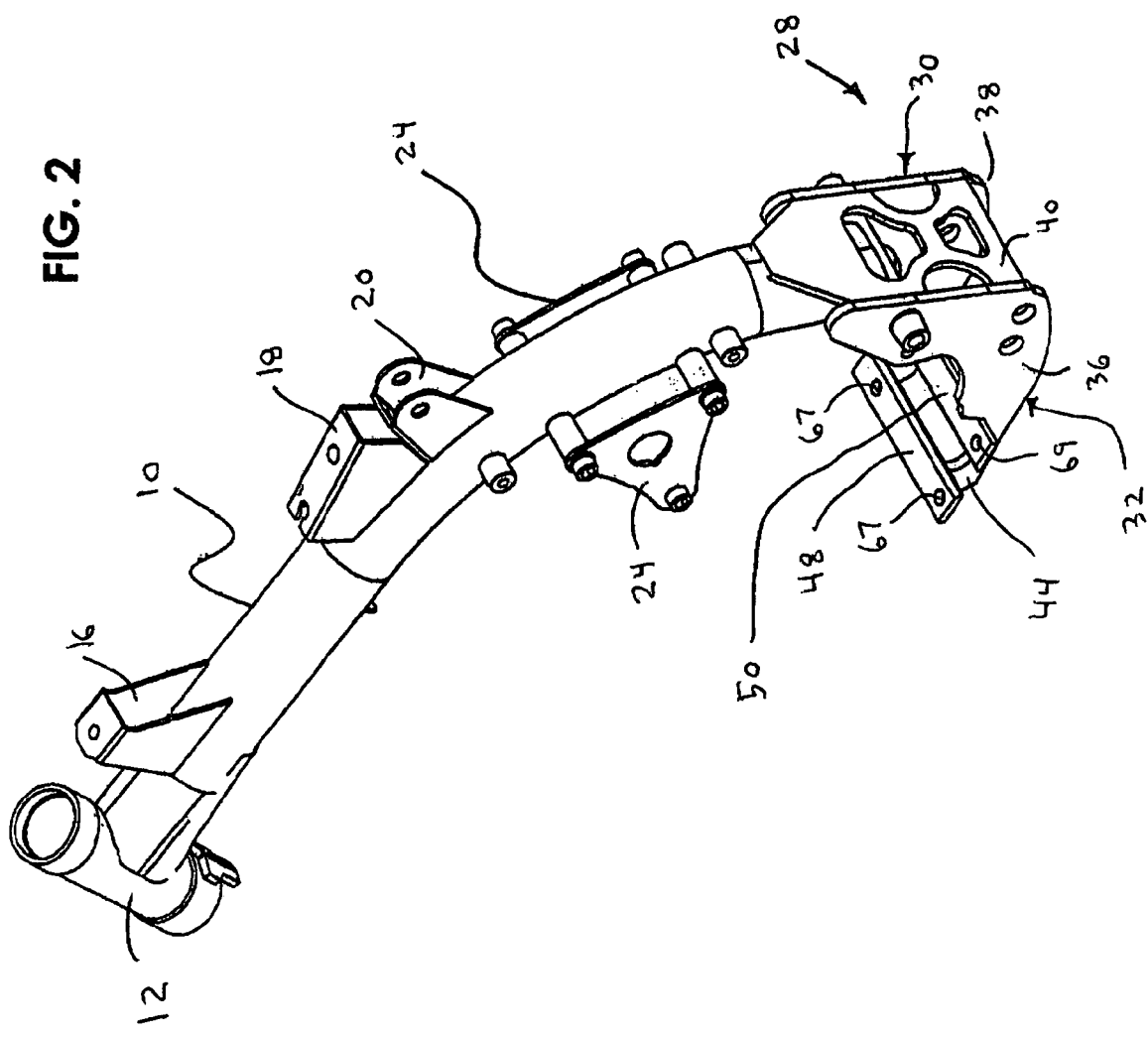
FIG. 2 shows an exploded view of the foot peg assy with cradle mount of FIG. 1.
Figure 3:
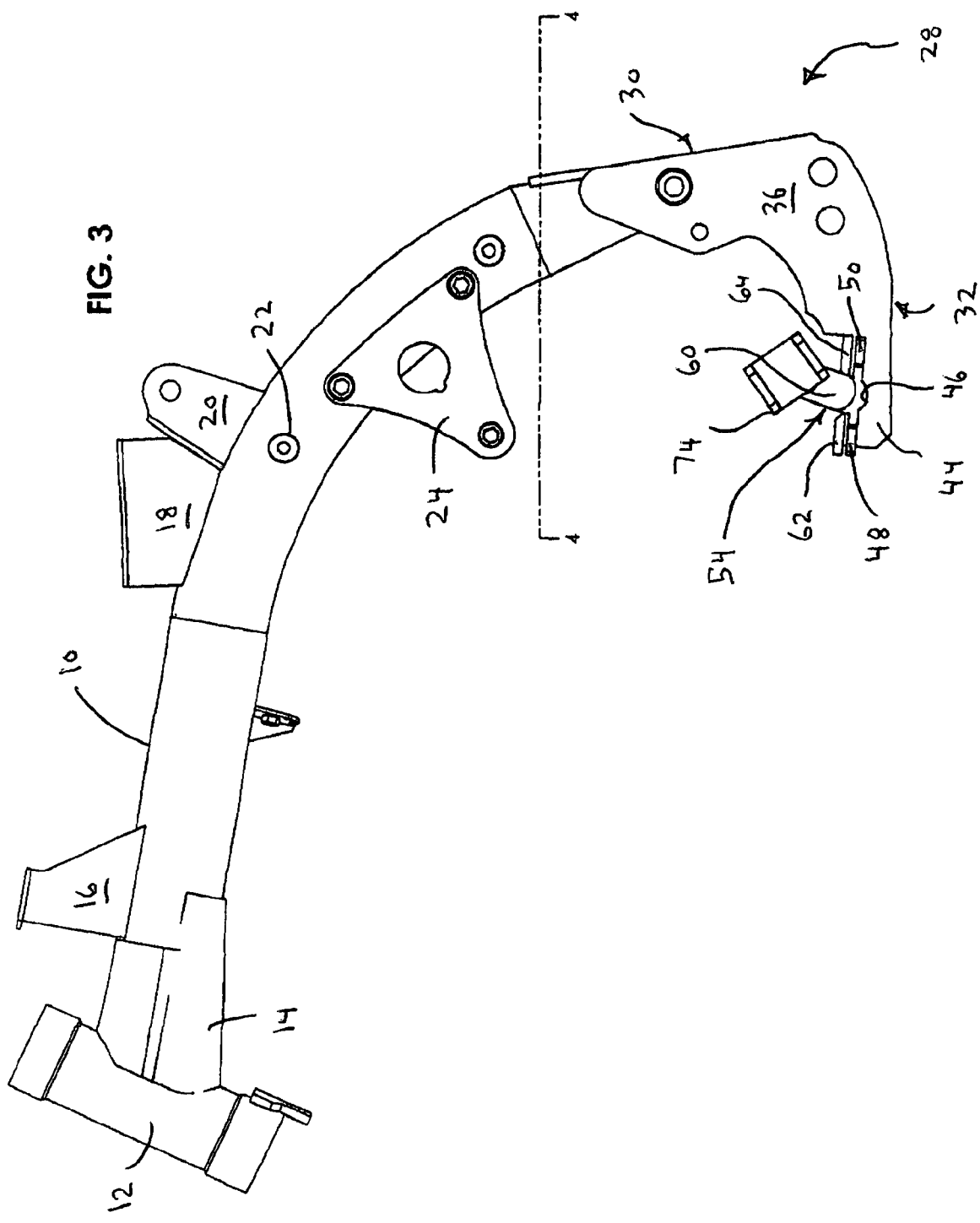
FIG. 3 is a side view of the foot peg assy with cradle mount of FIGS. 1 and 2.

A motorcycle engine 26 has its top end supportably connected to the respective motorcycle engine hangar brackets 24. The bottom end of motorcycle engine 26 is attached to cradle bracket 28. Cradle bracket 28 has an upright oriented attachment portion 30 and a forwardly extending foot peg support portion 32. As seen in FIGS. 1 and 2, cradled bracket 28 has a left side plate member 36 and a right side plate member 38. They are connected at their rear ends by a rear cross member plate 40. The upright oriented attachment portion 30 is connected to the rear end of tublar main frame 10. The forwardly extending foot peg support portion 32 has a pair of laterally spaced arm members 44 having recesses 46 formed in their top edges. Cross members 48 and 50 straddle the respective recesses 46 and provide a seat for foot peg support assembly 54.

The structure of foot peg support assembly 54 is best understood by referring to FIGS. 1 and 4. Foot peg support assembly 54 has an elongated rod member 60 with tab members 62 extending from one lateral outer surface and tab members 64 extending from the other lateral outer surface. These tab members have apertures 66 and 68 respectively that mate with aligned apertures 67 and 69 in the front and rear cross members 48 and 50. Bolts can be threaded upwardly through the aligned apertures into threaded bore holes in the bottom end of motorcycle engine 26. Rod member 60 has a clevis 70 and 72 mounted on its respective ends.

I claim:

1. A motorcycle comprising:
    an elongated main frame having a front end and a rear end; said main frame having a top surface, a bottom surface, a left side surface and a right side surface;
    a fork head tube is rigidly connected to said front end of said main frame;
    a cradle bracket having an upright oriented attachment portion and a forwardly extending foot peg support portion; said upright oriented attachment portion being rigidly connected to said rear end of said elongated main frame; said foot peg support portion extends forwardly beneath said bottom surface of said main frame that is positioned a predetermined height above said foot peg support portion;

a transversely extending foot peg support assembly having a left end and a right end; first attachment means on said left end for attaching a left foot peg thereto and second attachment means on said right end for attaching a right foot peg thereto; and said transversely extending foot peg support assembly being supported on said foot peg support portion of said cradle bracket so that substantially all of the weight of a rider in a standing position is entirely supported by said cradle bracket.

2. A motorcycle as recited in claim 1 wherein said foot peg support assembly bracket has a transversely extending elongated rod member having an outer surface.

3. A motorcycle as recited in claim 2 further comprising a plurality of tab members extending laterally from said outer surface of said elongated rod member.

4. A motorcycle as recited in claim 3 wherein said first and second attachments means are a first clevis and a second clevis for attaching foot pegs thereto.

5. A motorcycle as recited in claim 1 wherein said cradle bracket comprises a left side plate laterally spaced from a right side plate; a rear cross member plate secures said left and right side plates together along said rear of said upright oriented attachment portion of said cradle bracket.

6. A motorcycle as recited in claim 1 further comprising a motorcycle engine having a top end and a bottom end; upper engine support members secure said upper end of said motorcycle engine to said main frame; said bottom end of said motorcycle engine being supported on said forwardly extending foot peg support portion of said cradle bracket.

7. A motorcycle as recited in claim 6 further comprising means for attaching said bottom end of said motorcycle engine to said forwardly extending foot peg support portion of said cradle bracket.

8. A motorcycle as recited in claim 7 wherein said main frame is a tubular member.

9. A motorcycle as recited in claim 8 wherein said tubular member curves downwardly from its front end to its rear end.

10. A motorcycle as recited in claim 9 further comprising a fuel tank mounting structure on said top surface of said main frame adjacent said front end of said main frame.

11. A motorcycle as recited in claim 10 further comprising a seat mounting bracket on said top surface of said main frame positioned rearwardly of said fuel tank mounting structure.

\* \* \* \* \*